Figure 5:
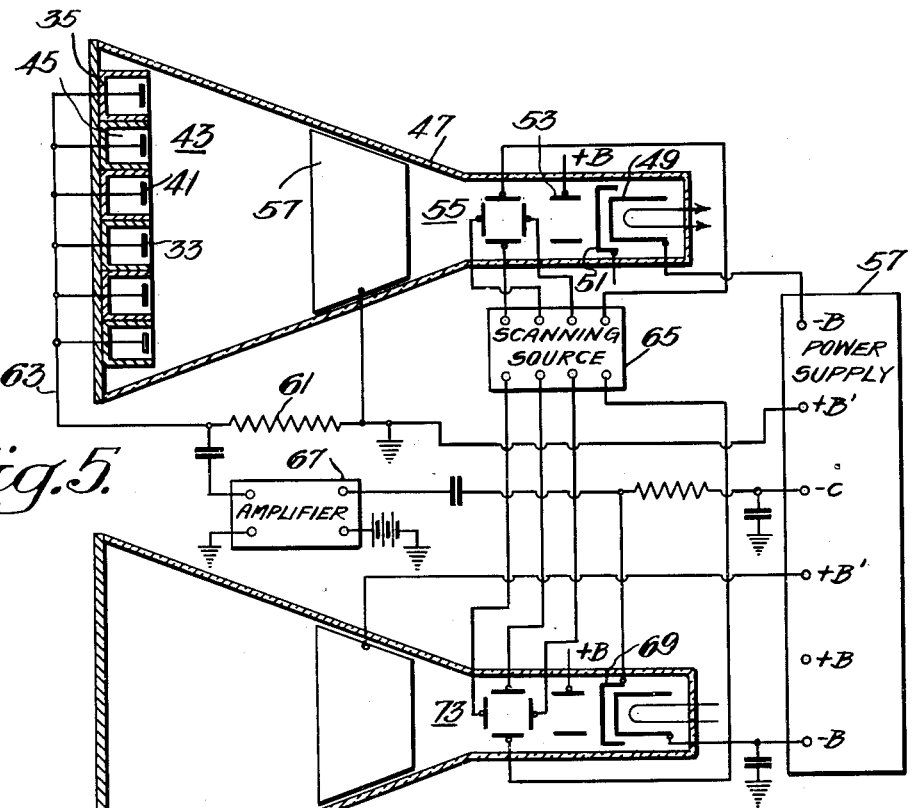

March 11, 1941.  I. WOLFF  2,234,328
RADIANT ENERGY RECEIVING DEVICE
Filed Sept. 24, 1937  3 Sheets-Sheet 1
Fig. 1ª
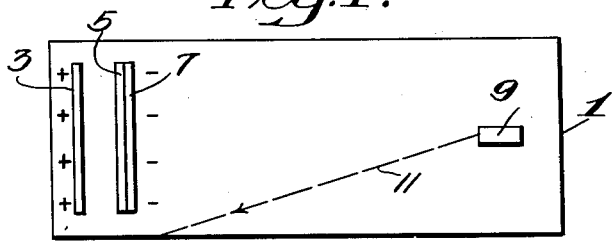
Fig. 1ᵇ
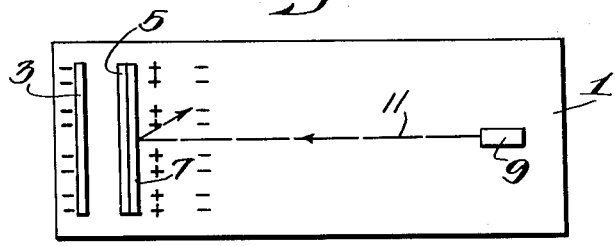
Fig. 1ᶜ
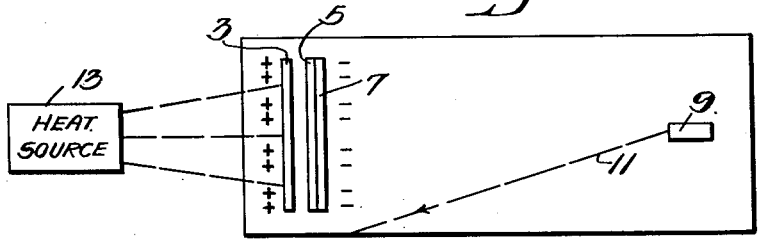
Fig. 1ᵈ
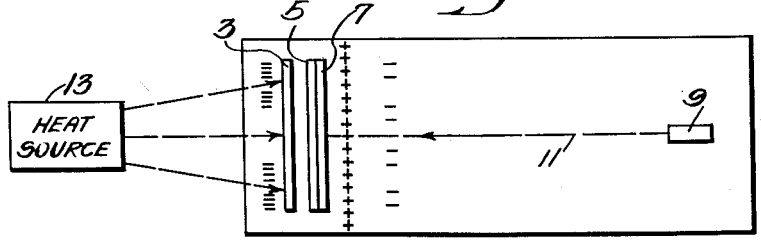
Inventor
Irving Wolff
By
Attorney March 11, 1941.   I. WOLFF   2,234,328
RADIANT ENERGY RECEIVING DEVICE
Filed Sept. 24, 1937   3 Sheets-Sheet 2
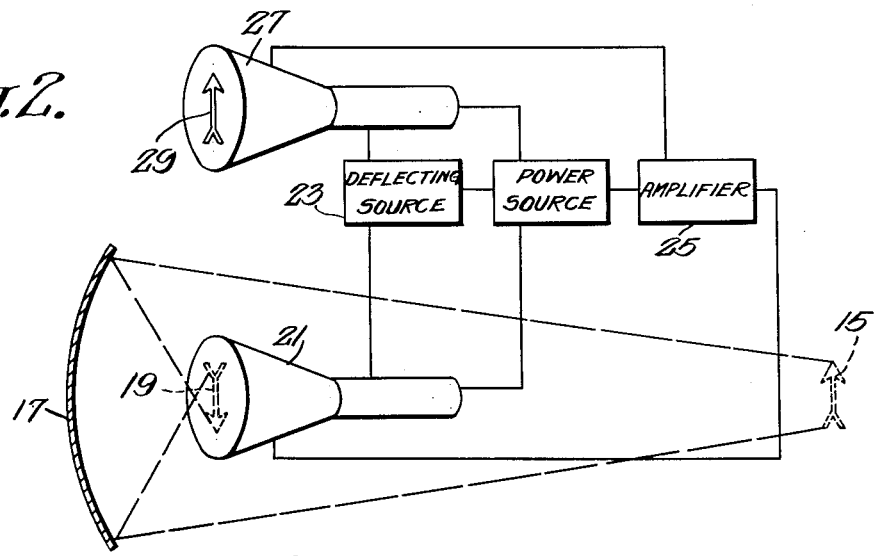
*Fig.2.*
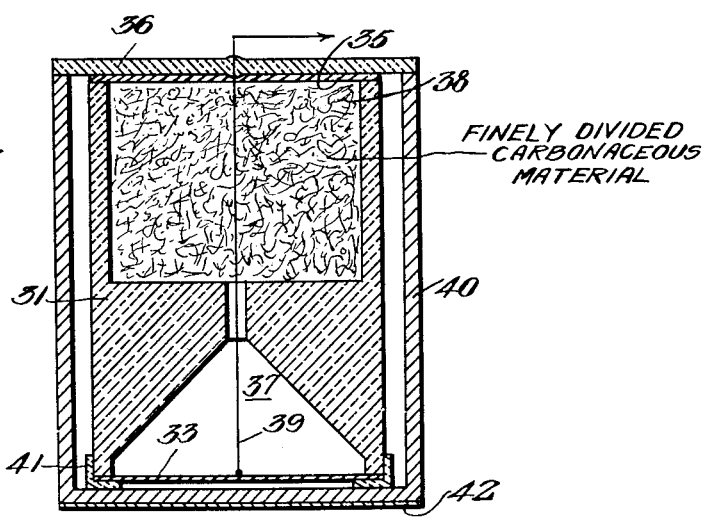
*Fig.3.*
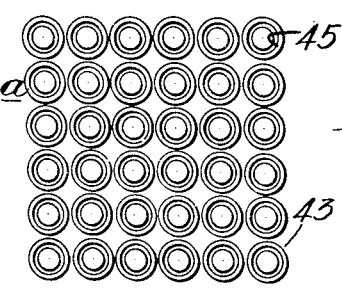
*Fig.4.ª*
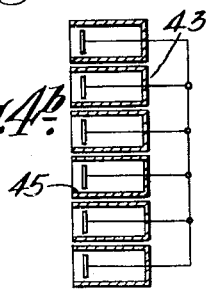
*Fig.4.ᵇ*
Inventor
Irving Wolff
By
Attorney March 11, 1941.    I. WOLFF    2,234,328

RADIANT ENERGY RECEIVING DEVICE

Filed Sept. 24, 1937    3 Sheets-Sheet 3

Inventor
Irving Wolff
By
Attorney

Patented Mar. 11, 1941

2,234,328

UNITED STATES PATENT OFFICE 2,234,328

RADIANT ENERGY RECEIVING DEVICE

Irving Wolff, Merchantville, N. J., assignor to Radio Corporation of America, a corporation of Delaware Application September 24, 1937, Serial No. 165,456

10 Claims. (Cl. 178—6.8)

My invention relates to a device for receiving radiant energy. More specifically, to a device for making a visible image of an invisible body radiating heat waves.

Instruments are now available using photoelectric principles for observing an invisible body radiating waves of a length slightly longer than light waves. Such instruments will not operate where fog is interposed between the radiating body and the instrument, because the photoelectric means is not responsive to wave lengths which will penetrate fog.

It is also well known that there are various means for detecting radiant heat energy of a wave length which will penetrate fog. While such devices can be used to detect and make known the existence of a radiating body, the amount of information conveyed is limited to such detection, and, in some instances, the measurement of the temperature of the radiating body. I propose to provide means for detecting not only the existence of an invisible body radiating heat but also to produce a visible image of the original heat-radiating body. There are numerous practical applications of my device. For example, my invention may be used to detect the presence of an aircraft which is invisible to the eye because of fog, by observing the radiation from the engine of said craft; also the movement of the craft may be detected. In a similar manner, the radiation from the smokestacks of vessels and the like may be detected, as well as the direction in which they are moving. A cold body, like an iceberg, will cast a shadow which may be detected.

Another practical use is as an instrument-landing system for aircraft. If the aircraft landing field is marked with suitable heat radiators, the receiving device located on an aircraft approaching the field may be used to indicate the field or, by a suitable arrangement, the angular position of the aircraft with respect to such field, even though the field should be invisible because of weather conditions.

One of the objects of my invention is to provide means for detecting radiant energy.

Another object of my invention is to provide means for producing a visible image corresponding to a body radiating heat.

Another object of my invention is to provide means for detecting the movements of an invisible moving body which is radiating heat waves.

A still further object is to provide means for guiding aircraft by visible indications from desired points which are produced by devices radiating heat.

Figure 6:
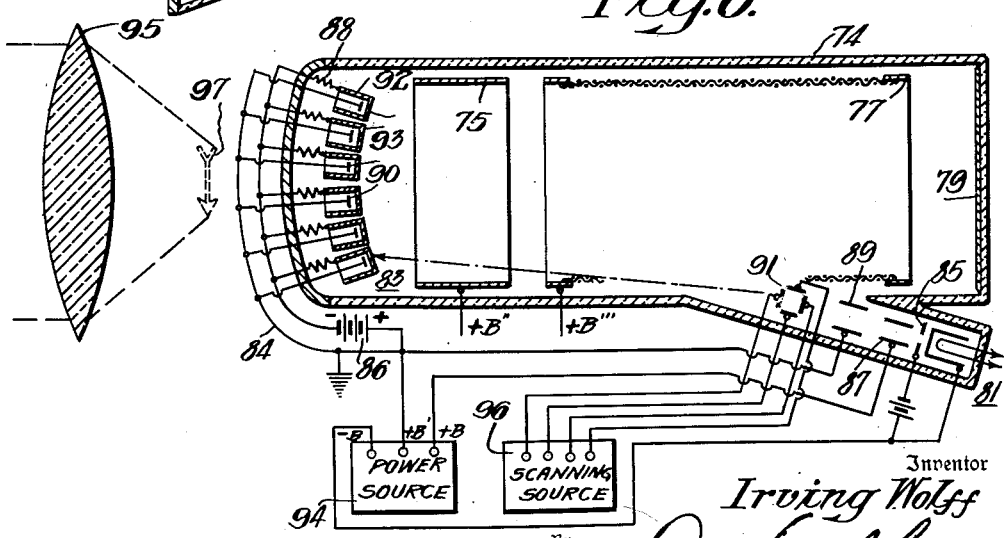

An understanding of my invention may be best had by reference to the accompanying drawings in which Figures 1ª, 1ᵇ, 1ᶜ and 1ᵈ are schematic drawings to illustrate the theory of the operation of my invention, Figure 2 is a schematic illustration of one embodiment of my invention, Figure 3 is a sectional drawing indicating a heat-responsive element, Figures 4ª and 4ᵇ represent respectively plan and sectional views of an assembly of heat-responsive elements, Figure 5 is a schematic circuit diagram of one arrangement of my invention, and Figure 6 represents a modification.

Referring to Fig. 1ª, within an evacuated chamber 1 are positioned the plates 3 and 5 of a capacitor. The first plate 3 is preferably a flexible metallic diaphragm. The other plate 5 has a surface 7 which has been suitably treated with caesium, whereby it will emit secondary electrons when primary electrons are impinged upon it from an electron gun 9.

If a stream of electrons emitted from the gun 9 are projected along the path 11 substantially no electrons will strike the secondary emissive surface 7. The stream of electrons 11 will, however, liberate a certain number of electrons (from adjacent emissive surfaces not shown), which will charge the plate 5 negatively as indicated. Through suitable circuits (not shown) the other plate 3 will become positively charged. Under normal circumstances, the emissive plate 5 will be negatively charged to approximately 1½ volts with respect to the nonemissive plate 3.

If the electron stream 11 is projected directly at the emissive surface 7, as shown in Fig. 1ᵇ, the primary electrons will liberate increasing numbers of secondary electrons. The secondary electrons taken away from the emissive surface 7 will leave the surface positively charged with respect to the plate 3. It has been determined that, after bombardment, the plate with the emissive surface 7 is approximately 3 volts positive with respect to the nonemissive plate 3. The secondary electrons thus liberated charge other plates negatively as mentioned above.

I propose to make use of this phenomenon for heat detection by changing the capacity between the plates when radiant energy within the heat spectrum is impressed on the heat receiving device. In Figure 1ᶜ I have represented the plates 3 and 5 as being more closely spaced due to the reception of radiation from the heat radiating source 13. While the plates are more closely spaced, the potential of the emissive surface will still be 1½ volts negative with respect to the nonemissive plate 3 as long as the electron beam 11 is not projected on the emissive surface. However, because the plates are closer together and, therefore, the capacity between them is increased, there will be a larger number of electrons on each of the surfaces. The presence of this larger number of electrons may be detected, as will hereinafter be described.

In Fig. 1d, I have represented the condition corresponding to Fig. 1c, with the additional effect caused by the impinging of the electron stream 11 on the emissive surface 7. As was the case in Fig. 1b, the plate, including the emissive surface, becomes 3 volts positive with respect to the nonemissive plate. However, the radiation from the heat radiating source 13 will bring the plates closer together, thereby increasing their capacity and increasing the number of electrons on the surface of the plates. In the foregoing illustrations, which are offered only as an aid in understanding the theory of operation, it should be understood that the minus (—) and plus (+) marks are not intended to represent any actual number of electrons but are merely illustrative of the action of the device under the several conditions described.

Before describing the details of the heat detecting elements, I shall briefly describe the operation of the system by reference to Fig. 2. The dotted arrow 15 represents an invisible body radiating heat. The radiations from the body 15 strike a reflector 17 and form a heat image which is represented by the dotted arrow 19. This heat image falls on the cathode ray tube 21 which includes a plurality of heat-responsive elements whose capacity varies as a function of the received radiant energy. These several capacities are successively scanned by means of a cathode ray which is deflected by impulses derived from the deflecting source 23.

The potentials derived from the changes of the capacity of the several heat detecting elements are applied to an amplifier 25 from which the amplified potential changes are impressed on the cathode ray tube 27. The cathode ray of tube 27 is synchronously deflected with the deflections in the receiving tube 21. The impressed potentials control the cathode ray intensity in accordance with the received signals, whereby a visible image 29 appears on the fluorescent screen and corresponds to the original body 15.

In Fig. 3, I have shown one embodiment of a heat detector in which an insulated form 31 is arranged with a flexible diaphragm 33 on one end and a heat transmitting diaphragm 35 on its opposite end. The flexible diaphragm 33 is preferably made of duralumin of about .001 of an inch in thickness. The diaphragm is stretched sufficiently to free it of wrinkles, and it is secured by cementing or clamping so that a gas-tight joint is formed between the diaphragm and the member 31. The second diaphragm may be made of any material which freely transmits radiant energy within the heat spectrum; i. e., wave lengths within the far end of the infra red region or of the order of 5 microns and upwards. Among such materials are rock salt, fluorite and sylvite. The second diaphragm 35 is also secured to the member 31 by cementing, clamping or the like, to form a gas-tight joint.

The member 31 includes an opening adjacent the second diaphragm 35. This opening is filled with a finely divided carbonaceous material 38, or finely divided or spongy rhodium, platinum, palladium, or the like, which freely gives off gases when radiant heat is impressed upon them. It has been found that such material includes a large area for the occlusion of gases. The region adjacent the duralumin diaphragm 33 includes a gas chamber 37. The diaphragm is connected by means of wire 39 which is brought out through the diaphragm 35 or through any other suitable opening which may be hermetically sealed. The flexible diaphragm 33 corresponds to the diaphragm 3 of Fig. 1a, etc., and moves under the influence of pressure within the gas chamber.

The assembly described above is placed within a metal shell 40. The lower portion of the shell is provided with a gasket 41. The gasket insulates the assembly from the shell and spaces the flexible diaphragm 33 from the end of the shell whereby a capacitor is formed. It is preferable to make the capacity between the flexible diaphragm and the end of the shell large and the capacity between the shell and fixed portions of the assembly small, to thereby permit maximum changes in capacity with varying gas pressures within the gas chamber 37. The outer surface 42 of the lower end of the shell is treated with silver, caesium, or its equivalent, to render the surface highly secondary emissive. The upper portion of the shell 40 is secured to a second heat transferring diaphragm 36 by cementing, clamping or the like. The junction between the shell and the diaphragm 36 is preferably vacuum tight, so that the gas chamber 37 may be operated over a wide range of gas pressures when the heat-responsive unit is placed within an evacuated envelope, as will be hereinafter described.

The heat-responsive elements of Fig. 3 may be made in any suitable form; for convenience in manufacture I prefer to use cylindrical elements. These elements are arrayed in a form 43 which supports and separately insulates the several members which are designated by the reference number 45. It should be understood that the greater the number of elements used, the greater will be the detail of the visible image which corresponds to the invisible body radiating heat. The elements 45 may be arranged in an array in the form of a square, rectangle, circle, or any convenient shape.

In Fig. 5 the several heat-detecting elements are shown assembled in the frame 43 and positioned adjacent the end of a cathode ray tube 47 so that the heat-transmitting diaphragms 35—36 are adjacent the end of the cathode ray tube. The end of the tube, instead of being made of glass, which is the customary construction, is made of rock salt, fluorite, sylvite or other suitable heat-transferring material. The second heat-transmitting diaphragm 36 may also serve to complete the end of the cathode ray tube instead of employing a separate heat-transferring material. The cathode ray tube includes the usual electron gun 49, control electrode 51, first anode 53, deflecting electrodes 55, and second anode 57. The second anode is connected to the +B source of the power supply 58 and to ground. A resistor 61 is connected from the second anode to the connector 63 which is common to the several duralumin diaphragms 33.

The end surfaces 42 of the shells 40, which are made electron-emissive as previously described, are facing the electron stream which is emitted from the electron gun 49. The deflecting electrodes 55, which are connected to a scanning source 65 and thereby suitably energized, deflect the cathode ray so that it successively scans each of the heat-detecting elements 45 at a frequency preferably above the persistence of vision. The scanning of the elements changes the potential of the emissive surface from −1½ to +3 volts with respect to the potential of the several duralumin diaphragms 33. This change of potential, together with the change in capacity of the several elements by the radiant energy falling on the heat-transparent diaphragms 35, causes changes in current to flow through the resistor 61. These changes in current are approximately proportional to the changes in capacity, which capacity changes are determined by the radiant heat falling on the several heat-detecting elements 45.

The changes in current established voltages which are impressed on the input of an amplifier 67 whose output circuit is connected to the control grid 69 of a conventional cathode ray tube 71. The cathode ray tube 71 includes deflecting electrodes 73, which are energized from the scanning source 65. Because the scanning source is common to the cathode ray tube 47, which includes the heat-detecting element 45, and to the visible image forming tube 71, it will be seen that the tubes are synchronously scanned and the radiant energy falling on the first cathode ray tube will produce impulses which in turn produce images on the fluorescent screen of the conventional cathode ray tube 71. These images will correspond to the original invisible object. It should be understood that the received visible image may be made equal to, larger or smaller than, the received invisible image, which may be made larger or smaller than the invisible body from which the radiation emanated.

The foregoing system requires two cathode ray tubes and a synchronous scanning means. It has the advantage that the receiving cathode ray tube 47 may be remotely positioned with respect to the visible image tube 71. However, in some installations a less complicated system may be desired. I have shown such system in Fig. 6 In this figure is shown an evacuated envelope 74 which includes a pair of focusing anodes 75, 77, a fluorescent screen 79, an electron gun assembly 81 and suitably arranged heat-detecting elements 83. The electron gun includes the usual control grid 85, first anode 87, second anode 89 and deflecting electrodes 91. The various electrodes are suitably connected to a power source 94 and a scanning source 96.

The cathode ray from the electron gun assembly should be focused on the heat-detecting elements 83. These heat-detecting elements correspond to the element shown in Fig. 3, but are preferably arranged to form a curved surface as shown. In the arrangement of Fig. 5, the emissive surfaces of the heat-responsive elements are charged negatively by the secondary electrons which are emitted from other elements. In the present modification substantially all of the secondary electrons from the emissive surfaces are drawn away and refocused to form the visible image on the fluorescent screen. Therefore, other means are supplied to charge the emissive surfaces, as, for example, a biasing battery connected as follows: The several duralumin diaphragms 90 are connected to a common lead 84 which is joined to the positive terminal of a biasing battery 86. The negative terminal of the biasing battery is connected to separate resistors 88, which are in turn connected to the shells 92, which are constructed of metal. The separate metal shells are insulated from each other and the diaphragms 90 so that the several capacities may be separately initially charged by the battery 86.

In the present construction, the plates 93, corresponding to the plates 5 of Fig. 1A, are made of metal which is suitably treated by caesium or the like to make the surfaces electron emissive. While a parabolic reflector may be used to focus the image on the heat-transparent end of the tube 73, I have shown, for the purpose of illustrating a modification of my invention which may be applied to the system of Fig. 2, a heat lens 95. The heat lens is made of Bakelite, fluorite or the like and positioned in front of the tube 73 so that the image 97 of the invisible heat-radiating body is focused on the heat-detecting elements 83, although for convenience of illustration the image is shown in front of the elements 83.

The operation of the present device differs somewhat from the embodiment illustrated by Fig. 5. In Fig. 6 the electrons liberated from the emissive surfaces of the several elements 83 by the cathode ray from the electron gun 81 are impinged on the screen 79 and focused thereon by the several anodes 75–77. The fluorescent screen 79 will directly indicate a visible image corresponding to the invisible heat image 97. The foregoing embodiment avoids the necessity of synchronous scanning and separate tubes.

Thus I have described a heat-responsive detector which may be arranged to generate a visible image which corresponds to the image of the invisible body or object whose heat radiations are being detected. It will be apparent that not only will the image be detected but the device will also indicate movements of an invisible body. While I have described the device as a heat wave receiver, it should be understood that, if the remote invisible body is at a substantially lower temperature than the heat receiver device, it will nevertheless be detected and a visible image or shadow may be formed.

I claim as my invention:

1. A heat receiver responsive to rays in the far end of the infra red spectrum including, in combination, means for receiving and transmitting heat of wave lengths of the order of 5 microns and upwards, a plurality of capacitor elements charged to substantially the same potential during non-scanning periods and responsive to said transmitted heat by changes in their capacity, means including an electronic scanning beam for scanning said capacitors to produce electron currents which vary as each of said capacitor elements vary in capacity, and means for making the effect of said electron currents in each of said plurality of means separately visible to thereby form an image.

2. A heat receiver responsive to rays in the far end of the infra red spectrum, means for receiving and transmitting heat of a wave length of the order of 5 microns and upwards, a plurality of means including capacities responsive to said transmitted heat whereby said capacities are varied by said heat, means for maintaining each of said capacities at substantially the same potential for a predetermined period, means including an electronic scanning beam for scanning said capacities to produce electron currents which vary as said capacity varies, and means for making the effect of said electron currents in each of said plurality of means separately visible to thereby form an image.

3. In a device responsive to rays in the far end of the infra red spectrum, means for establishing an invisible image corresponding to an invisible body radiating heat at wave lengths in the far infra red region, a plurality of capacitors having a capacity varying as a function of the radiant energy in said image, means for maintaining said capacitors at substantially the same potential for predetermined periods, means including an electronic scanning beam for scanning said capacities to produce electric currents which are substantially proportional to the variations in said responsive means, and means for visibly indicating an image corresponding to the invisible image received by said first-named means.

4. In an image-forming device responsive to rays in the far end of the infra red spectrum comprising in combination an evacuated envelope, a plurality of elements responsive to heat radiations on wave lengths of the order of 5 microns and upwards, said response being characterized as a change in electrical capacity, means for charging each of said elements to substantially the same potential, a portion of said capacity including an electron-emissive surface, means for impinging electrons on said surface whereby currents flow substantially proportional to the capacity, and means including said currents for producing a visible image corresponding to said capacity.

5. The method of forming a visible image of an invisible body radiating heat rays in the far end of the infra red spectrum which comprises applying said radiations to an array of elements responsive to radiations having wave lengths of the order of 5 microns and upwards, varying the capacity of each of the capacitors of an array of capacitors as a function of the response from each of said elements, applying substantially the same electric potential to each of said capacitors for a predetermined period, successively scanning said capacitors by impinging an electronic beam thereon to thereby cause currents to flow in proportion to the capacity of said capacitors, and forming an array of visible indications corresponding to said currents.

6. The method of forming a visible image of an invisible body radiating heat on wave lengths falling within the far end of the infra red region which comprises applying said radiations to effect capacity changes in each of a plurality of capacities, applying substantially equal electrical potentials to said capacities to maintain equal potentials thereon, successively scanning said capacities by impinging a beam of electrons thereon to thereby cause currents to flow substantially proportional to said capacities, and forming visible indications corresponding to said currents.

7. The method of forming a visible image of an invisible body radiating heat on wave lengths falling within the far end of the infra red region which comprises applying said radiations to effect capacity changes in a plurality of capacities, applying substantially equal electrical potentials to said capacities to maintain equal potentials thereon, successively scanning said capacities by impinging a beam of electrons thereon to thereby cause currents to flow substantially proportional to said capacities, forming another electron beam, deflecting said other electron beam in synchronism with said scanning, applying said currents to vary said beam, and forming visible indications by means of said beam corresponding to said invisible body.

8. The method of forming on a fluorescent screen a visible image of an invisible body radiating heat in the long wave portion of the infra red region which comprises, focusing said heat radiations on an array of heat-responsive elements, applying the response from each of said elements to capacitors respectively corresponding to said elements, charging said capacitors to substantially the same potential, maintaining said charging potential for a predetermined period, successively applying an electron beam to said capacitors whereby currents flow from each of said capacitors which are proportional to the capacity, and applying said currents to control a second electron beam which is impinged on said fluorescent screen to form a visible image corresponding to said invisible body.

9. A heat-energy receiving system including in combination an array of elements responsive to heat radiations of a wave length of the order of 5 microns and upwards, said elements each including a capacitor whose capacity varies as a function of the applied heat, means for maintaining substantially equal potentials on each of said capacitors during non-scanning periods, said capacitors each including a secondary electron-emissive surface, means for scanning said emissive surfaces with an electron beam whereby the electrical potentials of said capacitors are varied and whereby currents flow from said capacitors which currents vary as a function of said capacity, a cathode ray tube including control electrodes, deflecting electrodes, and a fluorescent screen, means for deflecting said cathode ray in synchronism with said electron beam and means for applying said currents to said control electrode whereby a visible image corresponding to said currents is formed.

10. An image forming device responsive to rays in the far end of the infra red spectrum including in combination a plurality of elements including capacitors responsive to heat radiations on wave lengths of the order of 5 microns and upwards, said response being characterized as a change in the electrical capacity of said capacitors, a portion of each of said capacitors including an electron-emissive surface, means for impinging electrons on said surface whereby currents flow substantially in proportion to the capacity, means other than said electron-impinging means for charging said capacitors to a predetermined voltage, and means including said currents for producing a visible image corresponding to the capacity of each of said capacitors.

IRVING WOLFF.